(12) United States Patent
Liu et al.

(10) Patent No.: US 6,381,131 B1
(45) Date of Patent: Apr. 30, 2002

(54) COMPUTER ENCLOSURE (75) Inventors: Alvin Liu, Pa-Li; Yun Long Chen, Chung-Ho, both of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 3 days.

(21) Appl. No.: 09/667,863

(22) Filed: Sep. 21, 2000

(30) Foreign Application Priority Data

Mar. 9, 2000 (TW) ...................................... 89203759 U (51) Int. Cl.⁷ ................................................ G06F 1/16
(52) U.S. Cl. ..................... 361/685; 361/752; 439/928.1; 360/97.01
(58) Field of Search ................................ 361/681, 685, 361/683, 686, 730, 714, 715, 752, 753; 439/628, 629, 928.1; 434/193; 312/245; 360/97.01, 97.03, 98.01, 98.08

(56) References Cited

U.S. PATENT DOCUMENTS 6,122,165 A * 9/2000 Schmitt et al. ............. 361/685

6,317,318 B1 * 11/2001 Kim ........................... 361/685

* cited by examiner

*Primary Examiner*—Leo P. Picard
*Assistant Examiner*—Hung Van Duong
(74) *Attorney, Agent, or Firm*—Wei Te Chung (57) ABSTRACT

A computer enclosure (100) includes a computer housing (1) and a drive bracket (6) mounted in the housing. The computer housing has at least a front panel (10), a side panel (50) and a bottom panel (30). The front panel has at least one finger (12). The side panel (50) has two supporting plates (52) each having a plurality of cutouts (53). The bottom panel has at least one post (32). The drive bracket has a base (60), a first side wall (62), a second side wall (64) and an end wall (66) which together define a space for receiving a disk drive therein. The first side wall forms a second chamber having a pair of opposite faces (74) abuttingly secured between the supporting plates of the side panel. The second side wall forms a bent plate (82) defining at least one aperture (84) for engagement with the finger of the front panel. The end wall defines a cutout (65) to retain the post of the bottom panel. The second side wall further forms at least one plate (86) and one finger (88) for securing a second drive bracket to the housing.

12 Claims, 11 Drawing Sheets

COMPUTER ENCLOSURE

BACKGROUND

1. Field of the Invention

The present invention relates to a computer enclosure, and particularly to a computer enclosure incorporating a bracket for stacking multiple drives therein.

2. The Related Art

Figure 14:
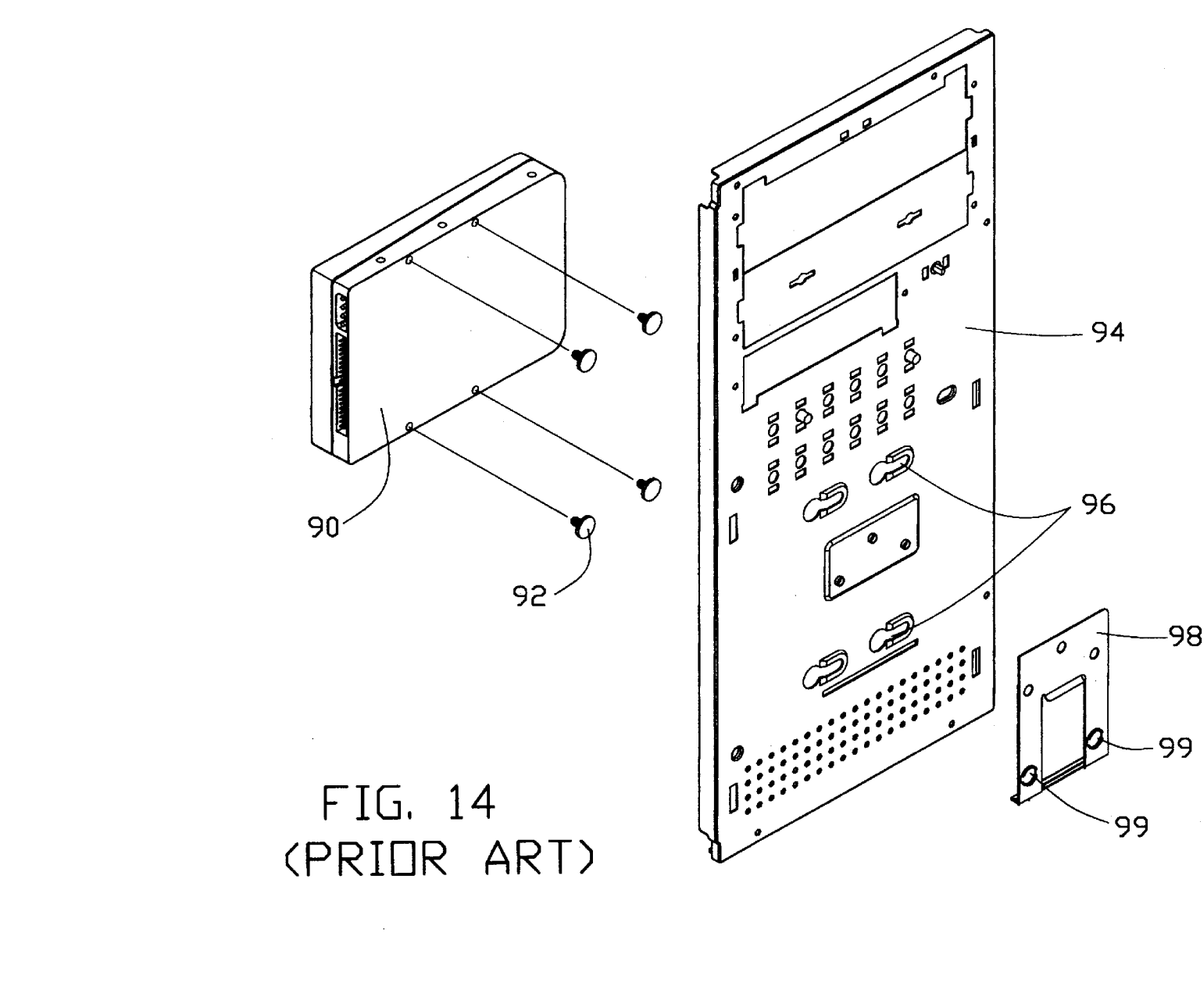
FIG. 14 is an exploded view of a conventional front panel of a computer housing with a disk drive to be attached thereto.

It is often desirable to design a computer housing to permit a user or a technician to easily install a disk drive into the housing and easily remove a disk drive therefrom. Typically, a disk drive is secured to a computer housing with screws or bolts. Referring to FIG. 14 (PRIOR ART), a disk drive 90 with four bolts 92 attached in a base face thereof is mounted to a front panel 94 of a computer housing. The bolts 92 extend through four apertures 96 defined in the front panel 94 and engage with holes 99 defined in a resilient plate 98, thereby securing the disk drive 90 to the front panel 94.

However, the bolts 92 engaged with the front panel 94 prevent movement of the disk drive 90 only in a direction perpendicular to the front panel 94, and not in any direction parallel to the front panel 94. This may cause the disk drive 90 to vibrate excessively. Such vibration may damage the disk drive 90 and components adjacent to the disk drive, and may adversely affect data storage and retrieval. Another disadvantage of using the bolts 92 to secure the disk drive 90 to the front panel 94 is that when replacing the disk drive 90, the user or technician must physically unscrew each bolt 92 in order to disengage the disk drive 90 from the front panel 94. Such a process is tedious and time consuming. Furthermore, this kind of computer housing assembly has no means to receive additional disk drives.

SUMMARY OF THE INVENTION

Accordingly, an object of the present invention is to provide a computer enclosure incorporating a drive bracket for securely receiving a disk drive therein.

Another object of the present invention is to provide a computer enclosure with a drive bracket for stacking multiple drives therein, thereby facilitating disk drive expansion.

A further object of the present invention is to provide a drive bracket having a simple structure which is easily assembled to a computer enclosure.

To achieve the above-mentioned objects, a computer enclosure in accordance with the present invention comprises a computer housing and a drive bracket mounted on the housing. The computer housing has at least a front panel, a side panel and a bottom panel. The front panel has at least one finger extending inwardly therefrom. The side panel has two supporting plates each having a plurality of cutouts. The bottom panel has at least one post. The drive bracket has a base, a first side wall, a second side wall and an end wall which together define a space for receiving a disk drive therein. The first side wall forms a second chamber having a pair of opposite faces abuttingly secured between the supporting plates of the side panel. The second side wall forms a bent plate defining at least one aperture for engagement with the finger of the front panel. The end wall defines a cutout for retaining the post of the bottom panel. The second side wall further forms at least one plate and one finger for securing a second drive bracket to the housing.

Other objects, advantages and novel features of the present invention will be drawn from the following preferred embodiment with attached drawings, in which:

DESCRIPTION OF THE PREFERRED EMBODIMENT

Figure 1:
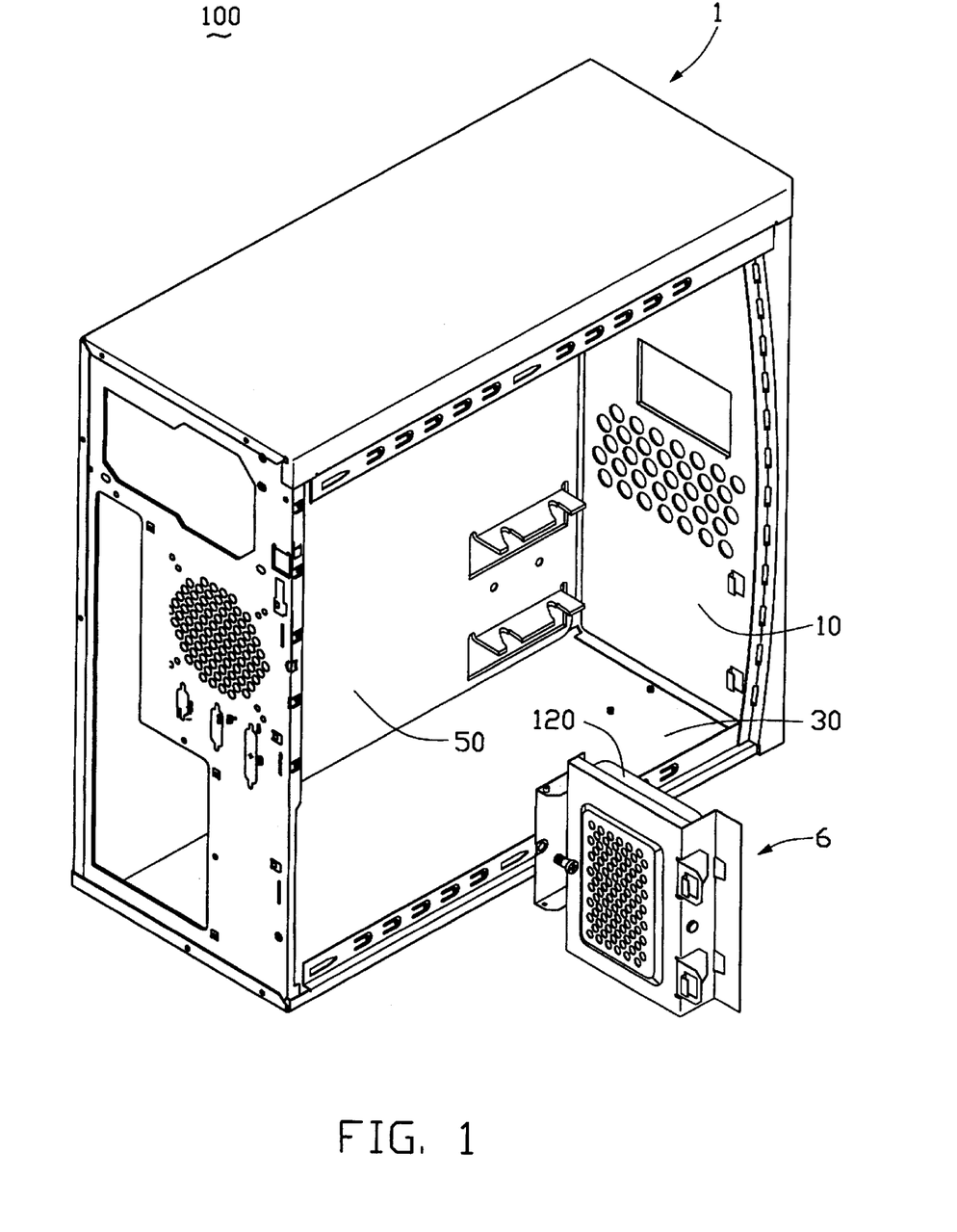
FIG. 1 is an exploded view of a computer enclosure of the present invention.

Referring to FIG. 1, a computer enclosure 100 of the present invention comprises a housing 1 and a drive bracket 6. The housing 1 has a front panel 10, a bottom panel 30 and a side panel 50 defining a first chamber (not labeled) therebetween for receiving electronic components. The drive bracket 6 retains a disk drive 120 and is mounted to the housing 1.

Figure 2:
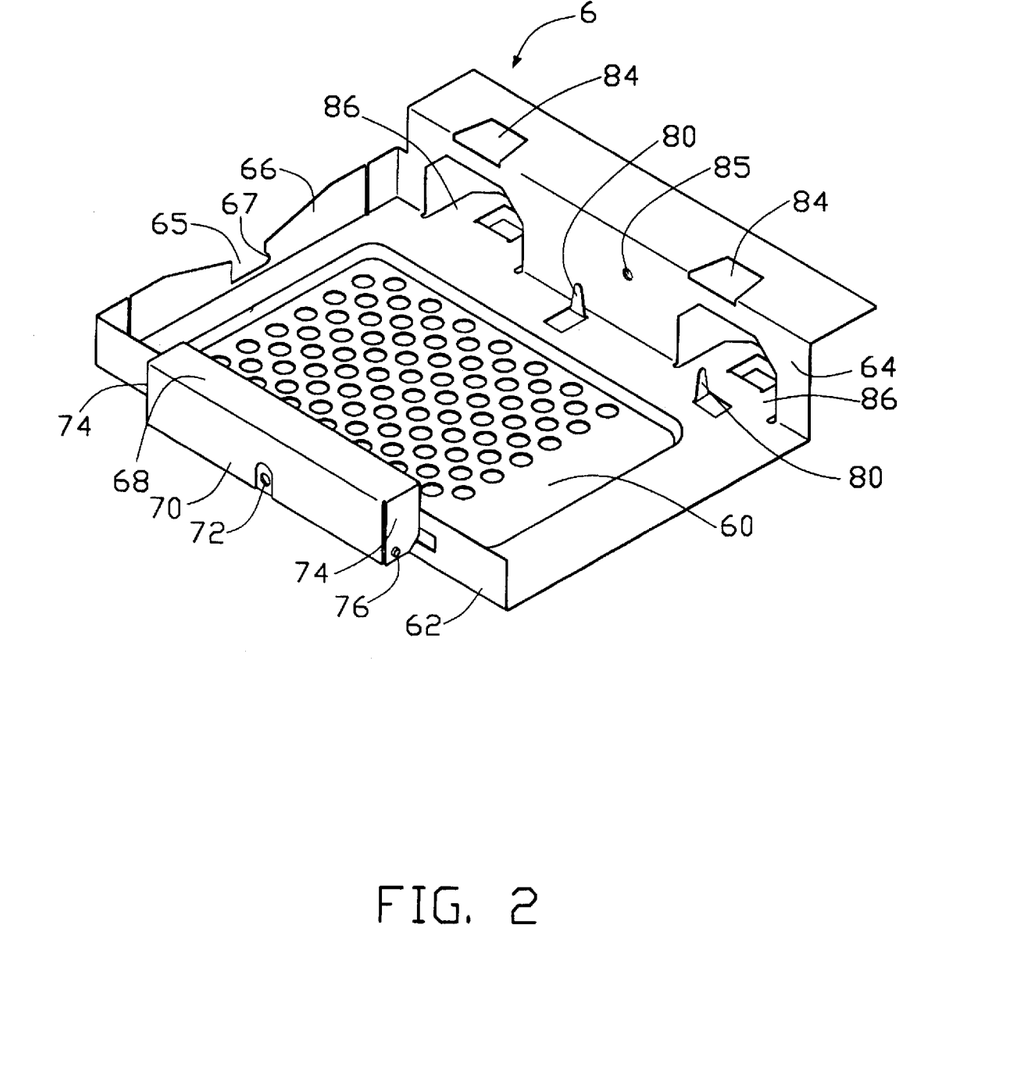
FIG. 2 is a perspective view of a drive bracket of the present invention.
Figure 3:
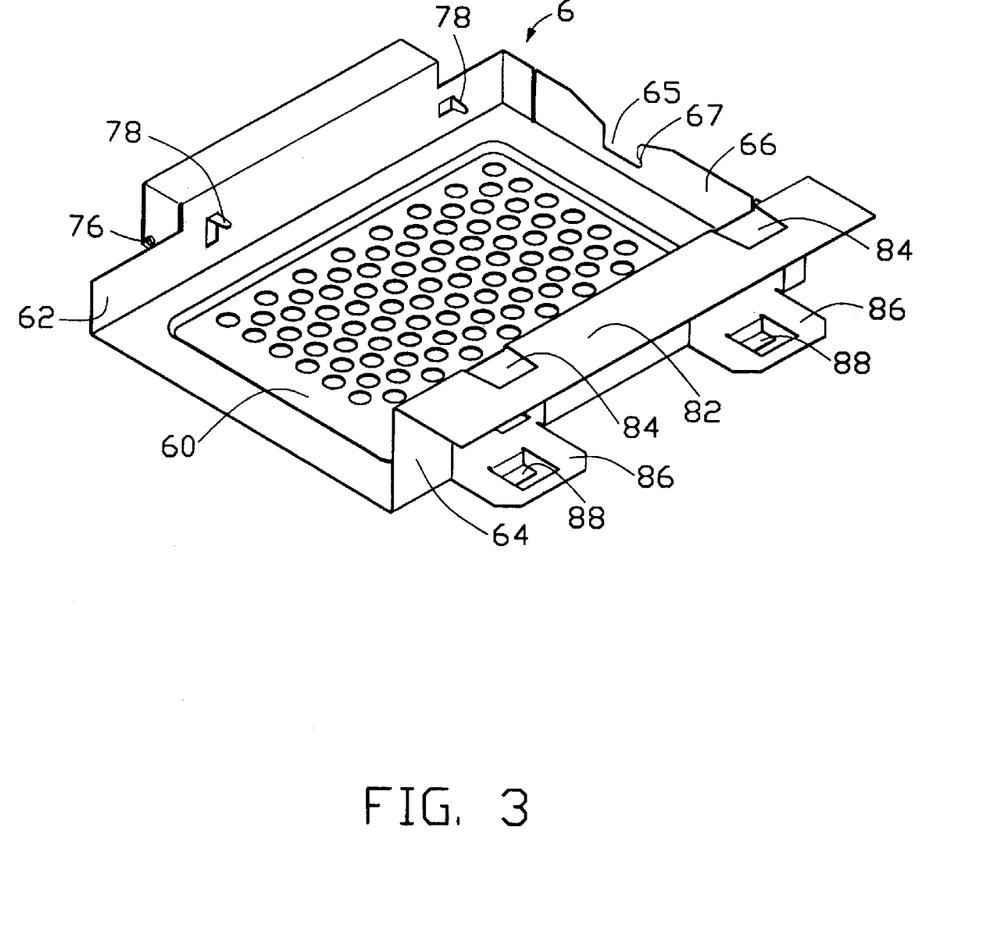
FIG. 3 is similar to FIG. 2, but showing the drive bracket from another angle.

Referring to FIGS. 2 and 3, the drive bracket 6 comprises a base 60, a first side wall 62 and a second side wall 64 extending perpendicularly from opposite sides of the base 60, and an end wall 66 extending perpendicularly from a third side of the base 60, together defining a space (not labeled) therebetween for receiving the disk drive 120.

The first side wall 62 extends upwardly and then outwardly to form a second chamber (not labeled) with a top face 68, a pair of end faces 74 disposed opposite each other, and an outer face 70. The outer face 70 is parallel to and opposite the first side wall 62, and defines a hole 72 for receiving a bolt therethrough. A pair of first posts 76 protrudes from respective opposite end faces 74. A pair of first pins 78 is stamped inwardly from the first side wall 62. Two plates 86 are stamped from the second side wall 64 and extend from the base 60, each having an L-shaped first finger 88. A bent plate 82 extends outwardly from a top edge of the second side wall 64. The bent plate 82 defines two apertures 84 extending from an edge where the second side wall 64 and the bent plate 82 meet. The second side wall 64 has a fixing hole 85 defined therethrough. A pair of second pins 80 is stamped upwardly from the base 60. The end wall 66 defines a first cutout 65 and a passage 67 communicating therewith.

Figure 4:
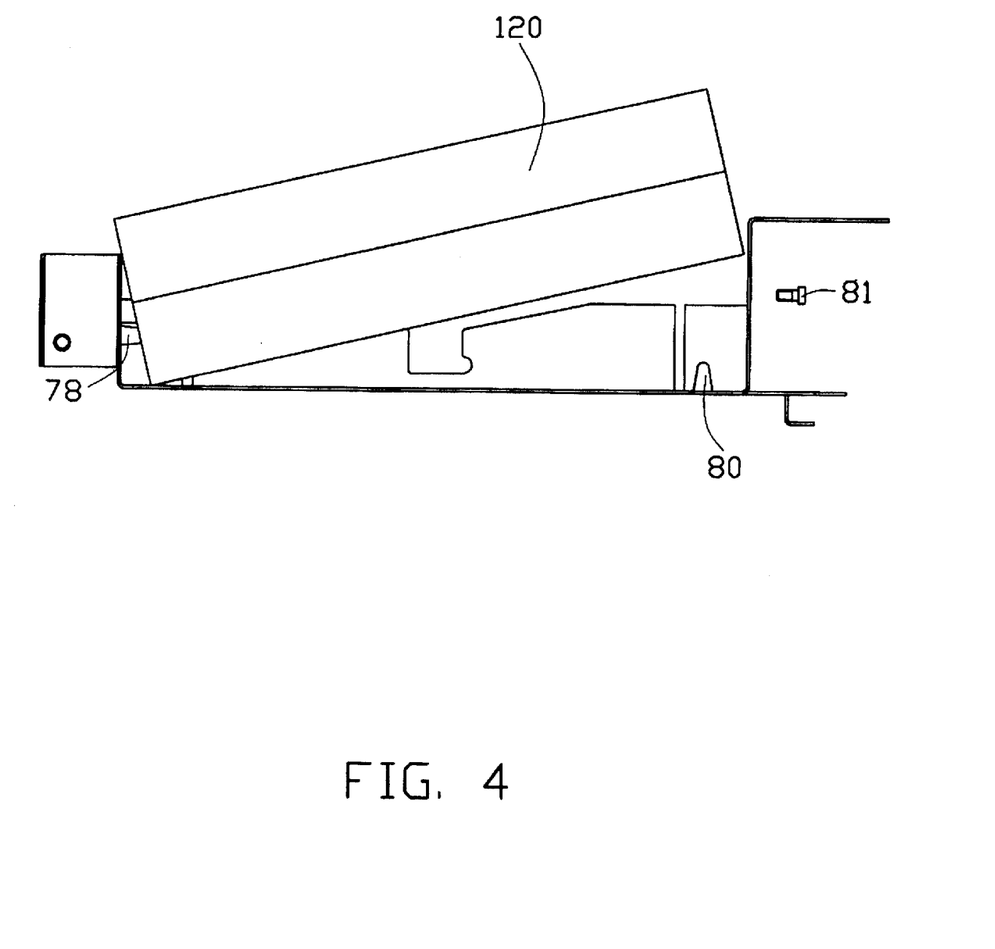
FIG. 4 is a side view of a disk drive being attached to the drive bracket of the present invention.

Also referring to FIG. 4, to attach the disk drive 120 to the drive bracket 6, the disk drive 120 is tilted to allow the pair of first pins 78 of the drive bracket 6 to enter into two corresponding slots defined in a side wall of the disk drive 120. The disk drive 120 is then pressed downwardly and the second pins 80 of the drive bracket 6 extend into two corresponding slots defined in a base of the disk drive 120. The disk drive 120 is thus received in the space defined in the drive bracket 6. The disk drive 120 is secured to the drive bracket 6 by a bolt 81 extending through the fixing hole 85 of the drive bracket 6 and engaging with a screw hole defined in a second side wall of the disk drive 120.

Figures 5, 6:
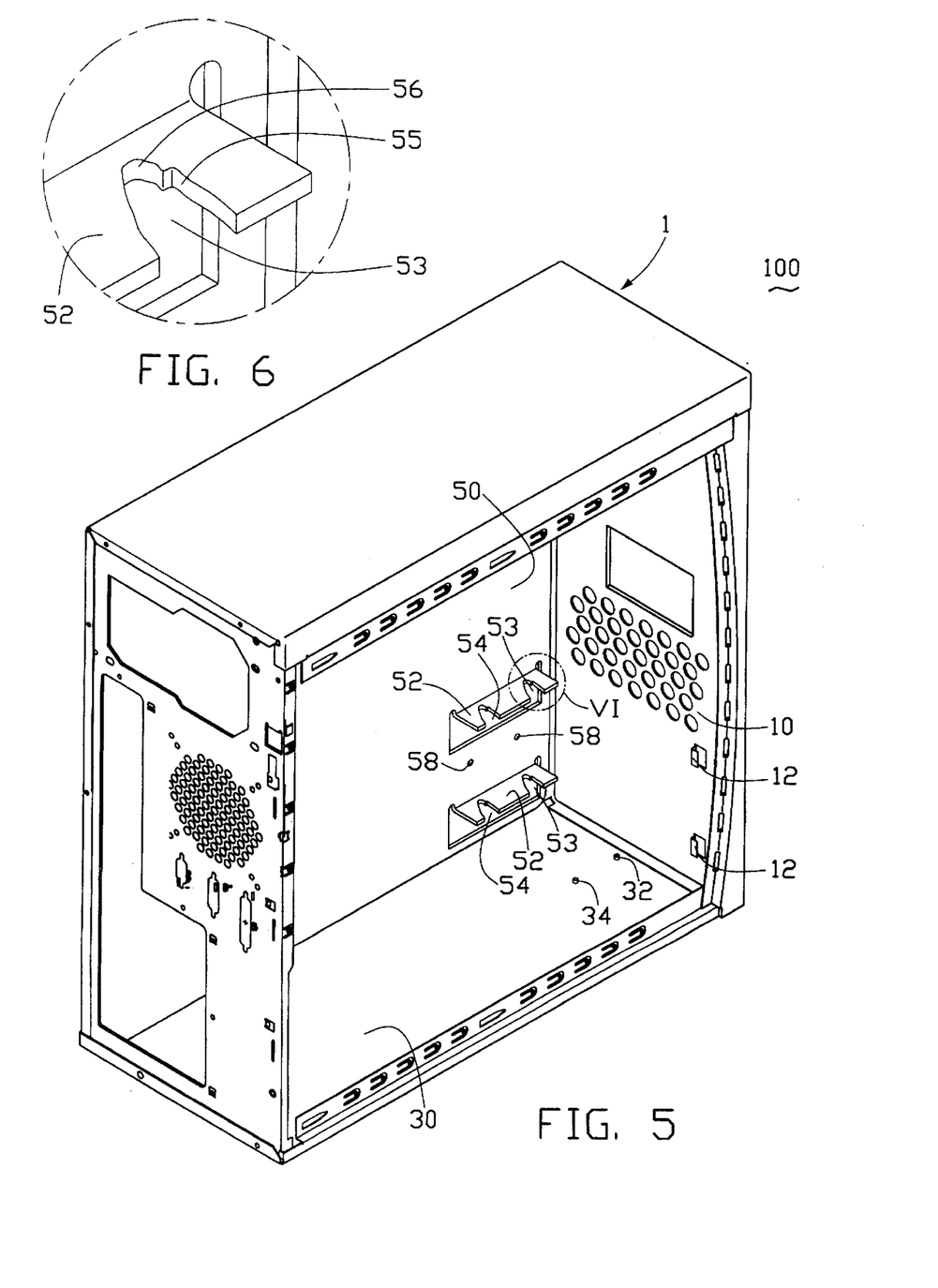
FIG. 5 is similar to FIG. 1, but without showing the drive bracket of the present invention.
FIG. 6 is an enlarged view of the encircled portion VI of FIG. 5.
Figure 7:
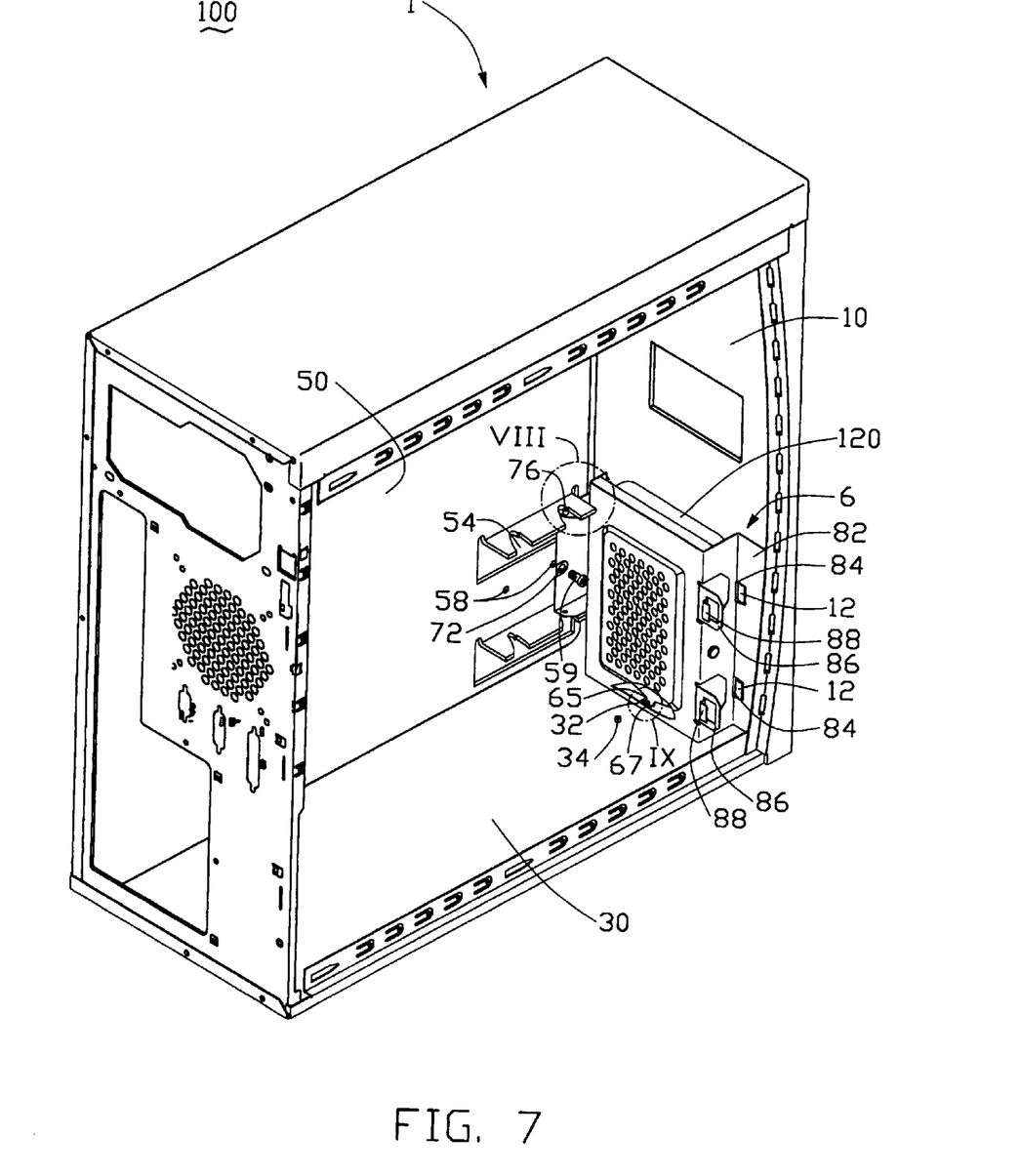
FIG. 7 is a nearly assembled view of FIG. 1, showing the drive bracket being situated at a first position during assembly with respect to the computer enclosure.

Referring to FIG. 5, the front panel 10 of the housing 1 has two L-shaped second fingers 12 stamped inwardly for slidably engaging with the apertures 84 of the drive bracket 6. A second post 32 protrudes perpendicularly from the bottom panel 30, for being first received in the first cutout 65 of the drive bracket 6 and then being slidably engaged with the passage 67 of the drive bracket 6. A third post 34 also protrudes perpendicularly from the bottom panel 30, for securing a second drive bracket in the computer enclosure 100 (see FIG. 13). A pair of supporting plates 52 extends inwardly from the side panel 50, for contacting the end faces 74 of the drive bracket 6 and the second drive bracket. Each supporting plate 52 has a second cutout 53 and a third cutout 54 defined therein, for receiving pairs of first posts 76 of, respectively, the drive bracket 6 and the second drive bracket. Referring to FIG. 6, each second cutout 53 comprises a first retaining portion 55 and a second retaining portion 56 communicating with the first retaining portion 55. Each first retaining portion 55 is for receiving the first post 76 therein in a first assembling position, and each second retaining portion 56 is for pivotably engaging with the first post 76 in a final assembling position. The third cutout 54 is identical in structure to the second cutout 53, for receiving the second drive bracket. A pair of screw holes 58 is defined in the side panel 50 between the two supporting plates 52, each corresponding to the hole 72 of the drive bracket 6.

Figure 8:
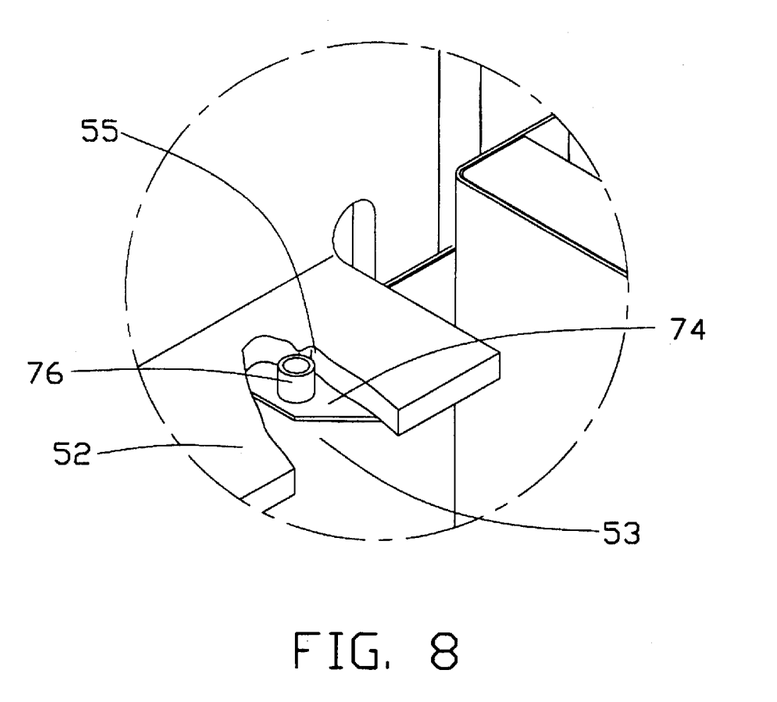
FIG. 8 is an enlarged view of the encircled portion VIII of FIG. 7.
Figure 9:
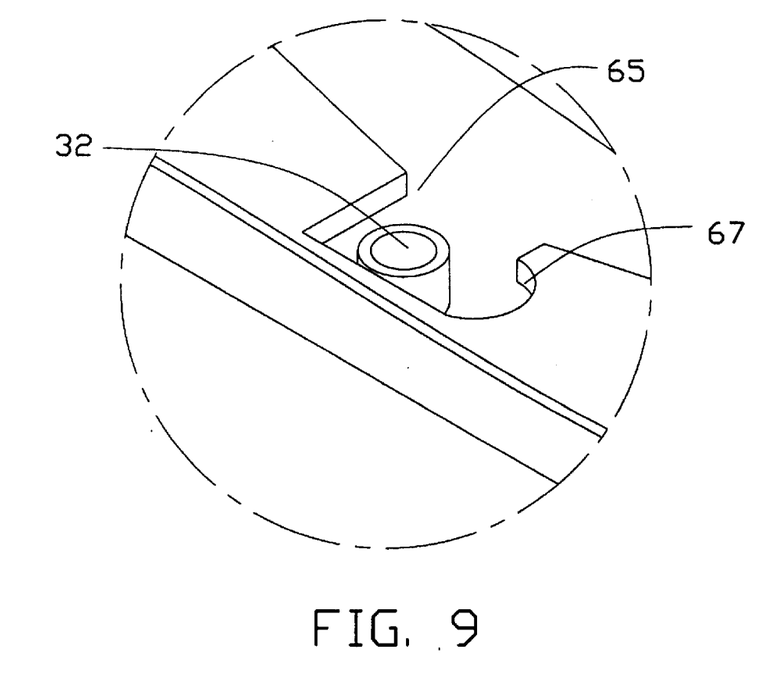
FIG. 9 is an enlarged view of the encircled portion IX of FIG. 7.
Figure 10:
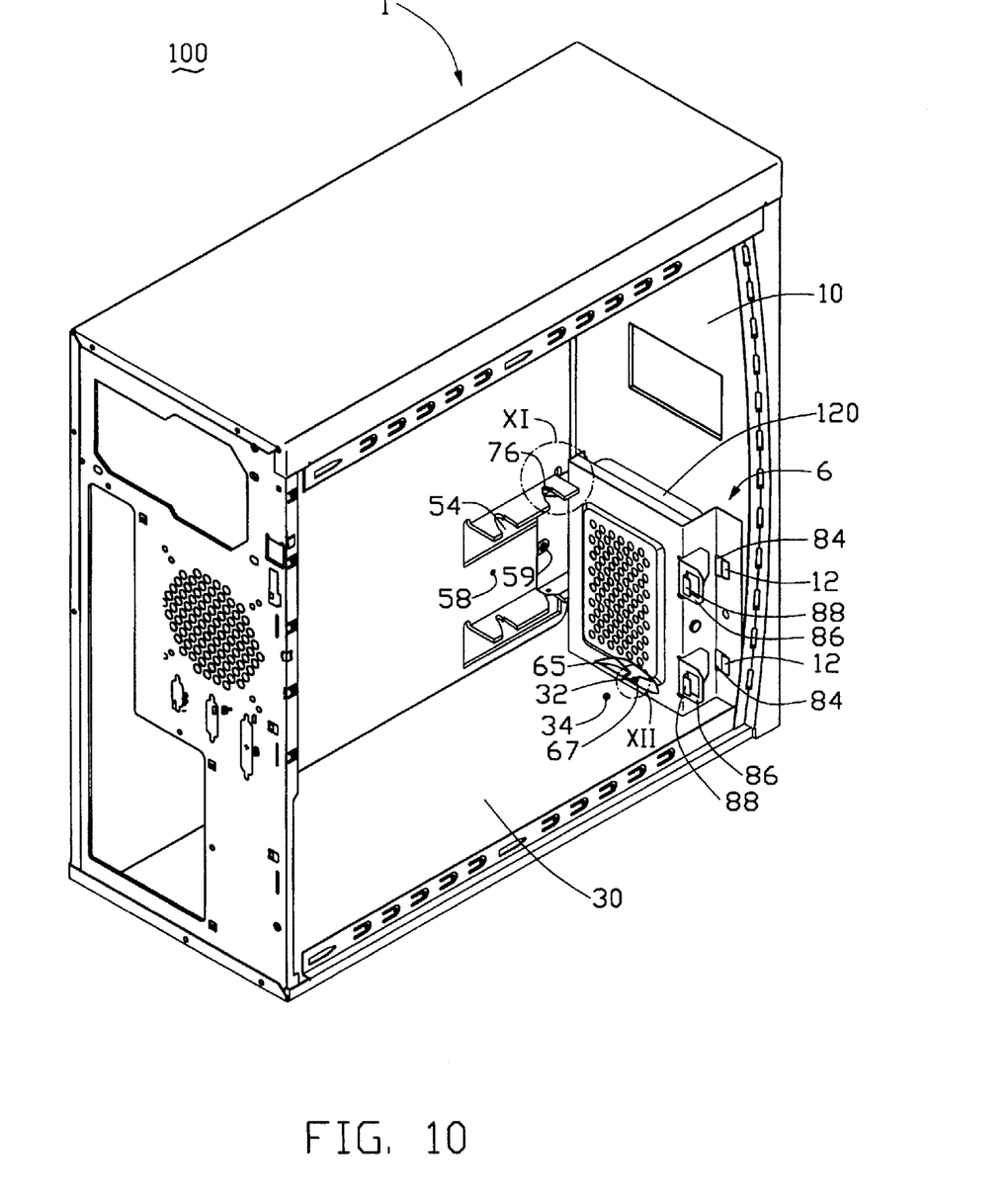
FIG. 10 is similar to FIG. 7, but showing the drive bracket situated at a fully assembled second position with respect to the computer enclosure.
Figure 11:
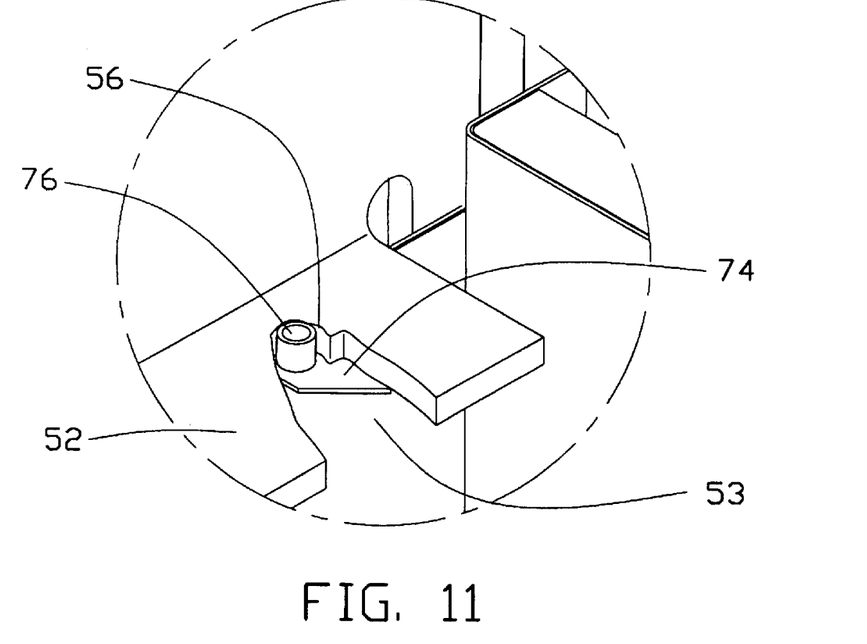
FIG. 11 is an enlarged view of the encircled portion XI of FIG. 10.
Figure 12:
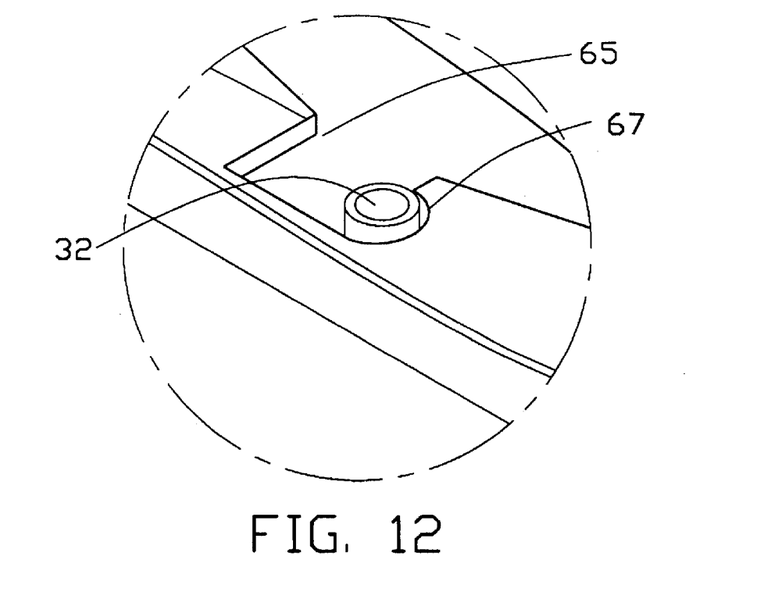
FIG. 12 is an enlarged view of the encircled portion XII of FIG. 10.

Referring to FIGS. 7–12, in assembly, each first post 76 of the drive bracket 6 enters the second cutout 53 of a corresponding supporting plate 52 and comes to rest against a wall defining part of the first retaining portion 55 (as shown in FIG. 8). The bent plate 82 of the drive bracket 6 contacts the front panel 10. The second fingers 12 of the front panel 10 enter the apertures 84 of the drive bracket 6. The second post 32 of the bottom panel 30 enters the first cutout 65 of the drive bracket 6 (as shown in FIG. 9). Then each first post 76 of the drive bracket 6 slides into the second retaining portion 56 of the corresponding supporting plate 52, and pivotably engages therein (as shown in FIG. 11). The second fingers 12 of the front panel 10 slidably engage with the apertures 84 of the drive bracket 6, thereby preventing the drive bracket 6 from moving in any direction parallel to the front panel 10. The second post 32 of the bottom panel 30 slidably engages with the passage 67 of the drive bracket 6 (as shown in FIG. 12), thereby preventing the drive bracket 6 from moving in a direction perpendicular to the front panel 10. A bolt 59 extends through the hole 72 of the drive bracket 6, and engages with the screw hole 58 of the side panel 50, thereby preventing the drive bracket 6 from moving in a direction perpendicular to the side panel 50. Thus, the drive bracket 6 is firmly secured to the enclosure.

Figure 13:
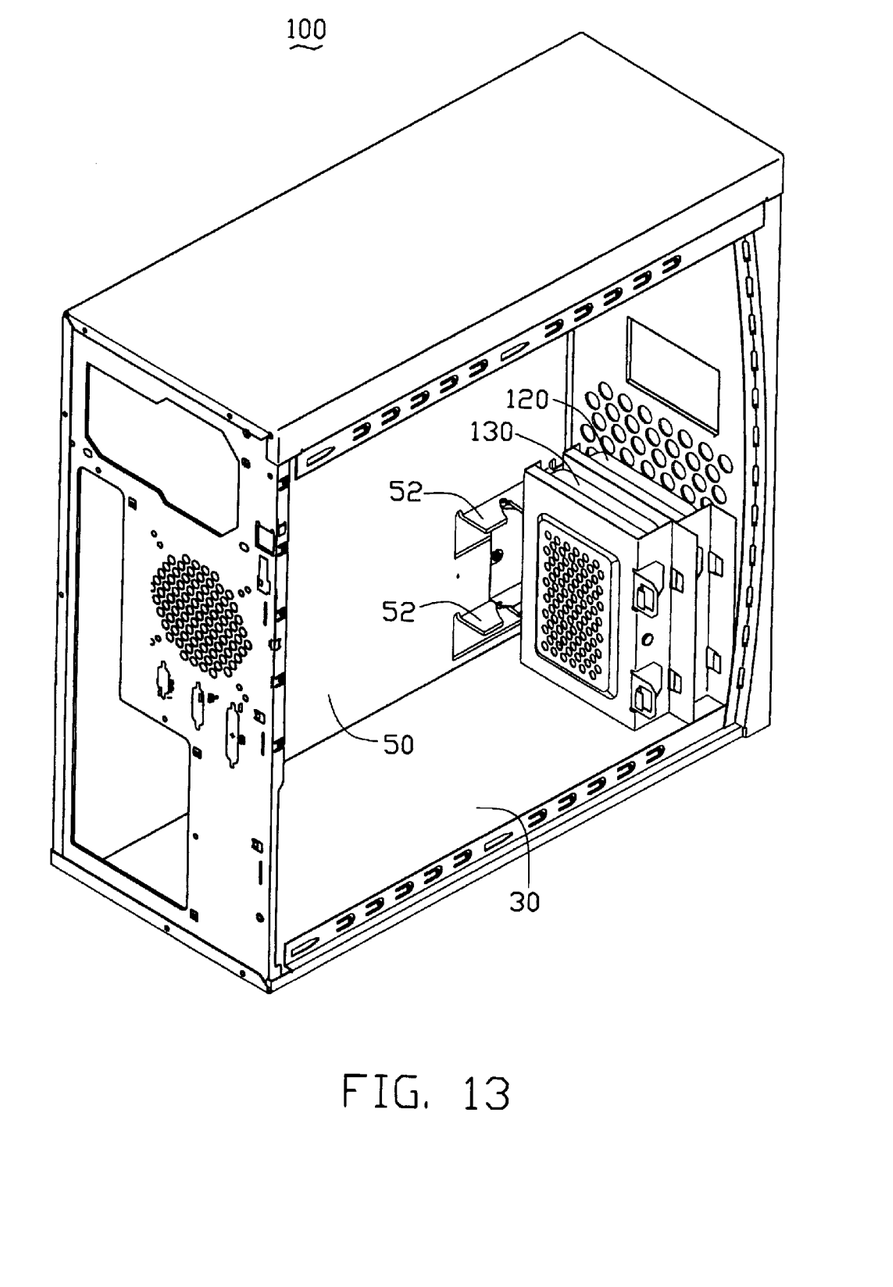
FIG. 13 is similar to FIG. 10, but showing a second drive bracket retaining a second drive therein, and showing the second drive bracket attached to the drive bracket.

With the first fingers 88 extending from the plates 86 of the drive bracket 6, the third cutouts 54 defined in the two supporting plates 52, another screw hole 58 defined in the side panel 50, and the third post 34 extending perpendicularly from the bottom panel 30, the computer enclosure 100 is able to receive a second drive bracket (not labeled) stacked on the drive bracket 6 (see FIG. 13).

Referring to FIG. 13, to secure a second drive bracket (not labeled) retaining a second disk drive 130 therein to the housing 1 of the computer enclosure 100, the same assembly process as described above is undertaken. Furthermore, two supporting plates 52 with a plurality of second cutouts 53, a side panel 50 with a plurality of screw holes 58 and a bottom panel 30 with a plurality of posts 32 together allow the computer enclosure 100 to accommodate a plurality of drive brackets stacked therein. This allows the computer enclosure 100 to function as either a low-end server or a high-end personal computer.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A computer enclosure comprising:

a computer housing having at least a front panel, a bottom panel and a side panel; and a drive bracket adapted to retain a disk drive therein, comprising:
a base for supporting the disk drive;
a first side wall extending from the base, for engaging with the side panel of the housing;
a second side wall extending from the base opposite the first side wall, for engaging with the front panel of the housing; and
an end wall extending from the base, for engaging with the bottom panel of the housing.

2. The computer enclosure of claim 1, wherein the end wall of the drive bracket defines a first cutout, for engaging with a post formed on the bottom panel of the housing.

3. The computer enclosure of claim 1, wherein the side panel of the housing forms at least a supporting plate for supporting the first side wall of the drive bracket.

4. The computer enclosure of claim 1, wherein the second side wall forms at least a bent plate defining at least one aperture to be slidably engaged with at least one finger formed on the front panel, thereby securing the second side wall to the front panel.

5. The computer enclosure of claim 1, wherein the first side wall defines at least a hole and the side panel defines at least a screw hole, for securing the first side wall to the side panel via a bolt.

6. The computer enclosure of claim 2, wherein the first cutout is generally L-shaped.

7. The computer enclosure of claim 3, wherein the at least a supporting plate defines a second cutout, for engaging with at least a post formed on the first side wall of the drive bracket.

8. The computer enclosure of claim 7, wherein the first side wall forms at least an end face for abutting against the supporting plate, and wherein the at least a post is formed on the at least an end face.

9. A computer enclosure comprising:

a computer housing comprising a front panel and a side panel; and a plurality of drive brackets stacked on each other, each drive bracket comprising a base, first and second side walls extending from opposite sides of the base and adapted to secure a disk drive therebetween, and at least one first finger extending from the drive bracket adapted to secure a second drive bracket, wherein the first side walls engage with the side panel of the housing and the second side walls engage with the front panel of the housing or the first finger of an adjacent drive bracket.

10. The computer enclosure of claim 9, wherein the side panel includes a plurality of supporting plates each having a plurality of cutouts, each first side wall forms a plurality of flanges abuttingly secured between the supporting plates, and a plurality of posts extends from the flanges to be engagingly received in the cutouts.

11. The computer enclosure of claim 9, wherein each second side wall forms at least a bent plate defining at least one aperture to either slidably engage with at least one second finger defined on the front panel, thereby securing the second side wall to the front panel, or alternatively, to slidably engage with at least one first finger of an adjacent drive bracket.

12. A computer enclosure comprising:
a computer housing comprising a side panel and another panel perpendicular to said side panel;
a pair of support walls extending from said side panel; and
a plurality of brackets stacked one another, each of said brackets comprising a base, first and second side walls by two sides of said base, said first side walls supportably engaged with the pair of support walls, said second side wall defining a bent plate and an extension plate spaced from each other in a parallel manner, said extension plate coplanarly extending from the base with a finger formed thereon; wherein the bent plate latchably abuts against the extension plate of the adjacent bracket by means of the corresponding finger of said extension plate while the bent plate of a bottom bracket latchably abuts against said another panel.

* * * * *